Sept. 26, 1933.　　　　G. W. ALDEEN　　　　1,927,865
GLASS CUTTER
Original Filed Sept. 3, 1925　　2 Sheets-Sheet 1
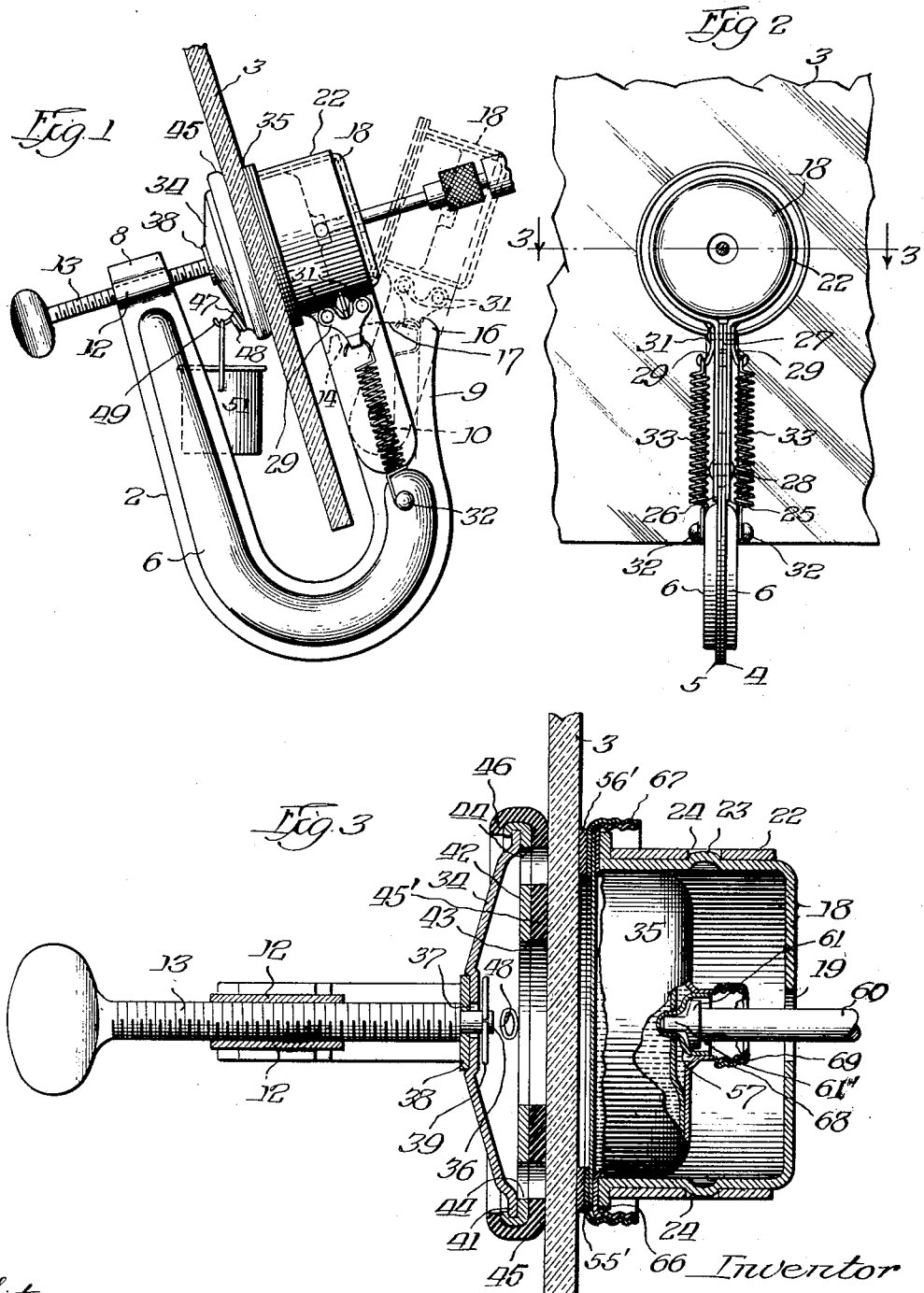

Sept. 26, 1933.     G. W. ALDEEN     1,927,865
GLASS CUTTER
Original Filed Sept. 3, 1925    2 Sheets-Sheet 2
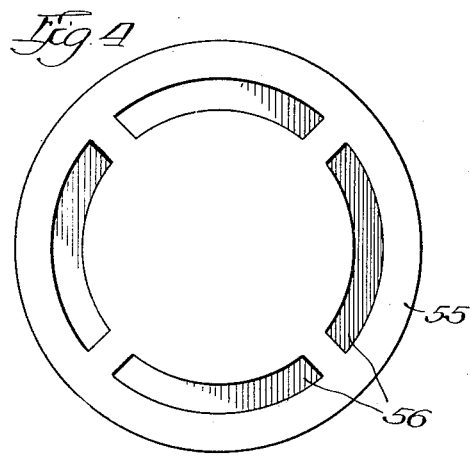
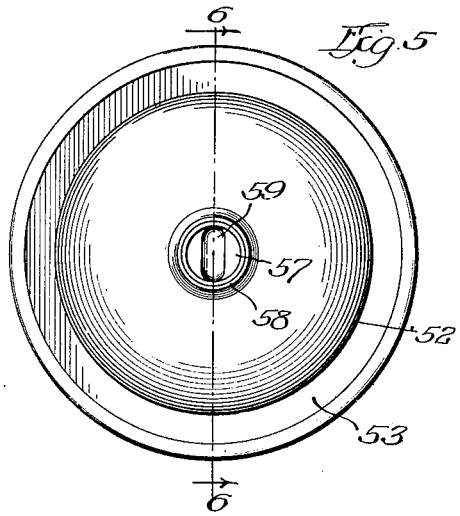
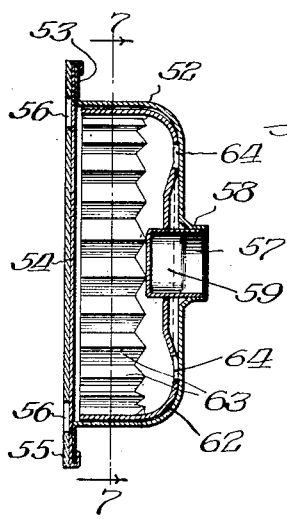
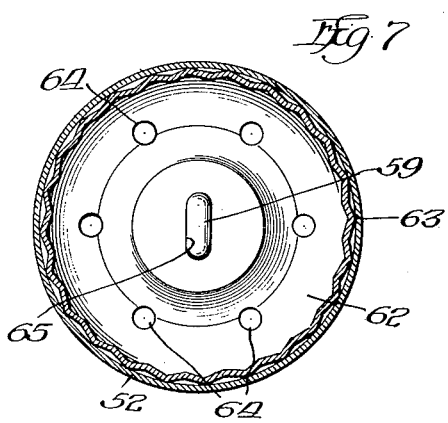
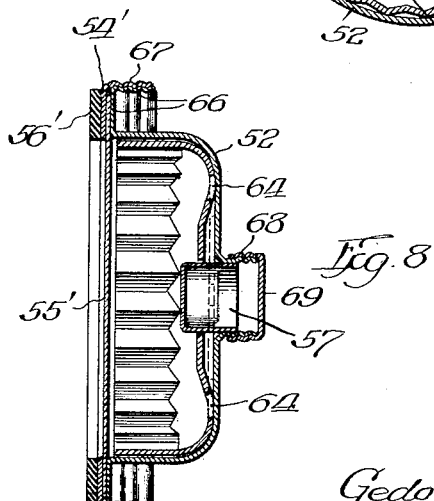

Patented Sept. 26, 1933

1,927,865

UNITED STATES PATENT OFFICE 1,927,865

GLASS CUTTER

Gedor W. Aldeen, Rockford, Ill., assignor to Fyrac Manufacturing Co., Rockford, Ill., a corporation of Illinois Application September 3, 1925, Serial No. 54,171
Renewed July 27, 1932

30 Claims. (Cl. 125—20)

This invention pertains to apparatus for cutting holes in glass or other material and while capable of cutting holes for various purposes, it has been designed primarily for cutting holes in glass windshields and the like of automobiles for the reception and mounting of windshield spot lights, such as those, for instance, disclosed in Patent #1,501,704 issued July 15, 1924. The form of the invention herein illustrated and described is of the general type disclosed in my copending application, Serial No. 3,253, filed January 19, 1925 of which this application is a continuation in part.

Heretofore, cutters for the purposes above noted comprised a large housing adapted to receive abradant, a liquid carrier for the abradant and a revoluble cutting tool around which the abradant was disposed with the housing arranged to be clamped to the material (usually sheet material). This type of cutter required that the apparatus be secured to the material through which the opening was to be cut before the abradant and liquid carrier could be poured into the housing, otherwise the abradant would run out of the housing with the loss of the abradant and its liquid carrier and resulted in great inconvenience. The structures of most of these earlier cutters were heavy and cumbersome and no means was provided whereby abradant and its liquid could be disposed of conveniently after the opening through the glass or other material had been cut. In a case where an automobile windshield was being cut through, it often occurred that the abradant and liquid carrier and other debris from the cutting operation flowed into or onto the body of the automobile, disfiguring or otherwise detrimentally affecting the parts on which it ran.

I have found that I can collect substantially all of the debris or refuse including the used abradant, its liquid carrier and the fine glass particles formed during the cutting operation, and completely prevent it from falling or running onto places where it would be undesirable or detrimental. In some cases it has happened that slight leakage of abradant and liquid occurred between the cartridge shell and its nipple before or during the cutting operation, but I have discovered that this leakage also may be avoided or rather prevented, by a simple expedient.

In the present invention therefore, one of the primary objects is to provide means whereby abradant and liquid carrier and debris formed during the cutting operation, or in other words, all refuse may be caught and prevented from flowing onto or into the vehicle or other place where it may not be desired to have it flow. To accomplish this purpose, a suitable receptacle which may be used in connection with the clamping mechanism as an integral part thereof or separate therefrom as desired, is provided and means are provided to receive all such refuse therefrom for easy disposal.

Another object of the invention is to provide a cutter adapted for incorporation in a cartridge such as that disclosed in my aforesaid copending application or for incorporation in a novel form of cartridge to be hereinafter disclosed with which the abradant and liquid contained in the cartridge will be more thoroughly distributed to the edge of the cutter and the amount of leakage between the driving tool socket or nipple and the cartridge body will be reduced to a minimum.

A further object is to provide a novel form of cartridge which may be economically manufactured and which may be refilled and used again.

Still further objects of the invention include improvements in the cartridge holder and bracket or glass clamp, as it may be variously termed, whereby the refuse receiving receptacle may be adjustably and tightly secured against the face of the material through which the opening is being cut, opposed to the cartridge and cartridge holder; a unique form of gasket adapted to be interposed between the face of the glass adjacent the adjustable clamp or the refuse receptacle; and a unique type of bracket which may be economically manufactured from pressed metal upon which the cartridge holder and clamp and the refuse receptacle may be mounted.

Many other objects and advantages will become apparent from the description and claims and from the drawings in which:

Fig. 1 is a side elevation of a cutter embodying my invention as applied to a windshield.

Fig. 2 is an elevation looking from the right at Fig. 1.

Fig. 3 is an enlarged sectional view taken on the line 3—3 of Fig. 2 with the cartridge of Fig. 8.

Fig. 4 is a plan view of the face of a type cartridge constructed in accordance with the invention.

Fig. 5 is a plan view of the rear face thereof.

Fig. 6 is a sectional view of the cartridge taken on the line 6—6 of Fig. 5.

Fig. 7 is a sectional view taken on the line 7—7 of Fig. 6, and

Fig. 8 is a central sectional view similar to that of Fig. 6 of a modified type of construction of cartridge.

The bracket

The bracket generally designated 2 is of U-shape, the legs of which are adapted to embrace a sheet of glass 3. The bracket is preferably formed from two pieces of sheet metal of corresponding shape and pressed symmetrically to form right and left hand sides 4 and 5 with a ridge 6 thereon for the purpose of lending strength and rigidity to the assembly. The upper portions 8 and 9 of the arms of the bracket are not changed from their original flat state, except that the arm 8 is provided near its upper portion with outwardly pressed semi-cylindrical portions 11 and 12 on each side to form an opening which is tapped to receive an adjusting screw 13 to be hereinafter described and the flat upper portion 9 of the other arm is formed as shown clearly in Fig. 1 and in the copending application to which reference has been made, to provide a notch 14 and a lug 16 at opposite ends of an arcuate edge 17. This latter mechanism is for the reception of the cartridge holder and its swinging yoke.

The cartridge holder

The cartridge holder or cartridge housing as it may be termed, designated 18, is formed in cylindrical shape as will be seen from Fig. 2. It may be made by pressing sheet metal with dies, is provided with an opening 19 for the reception of the driving or driven shaft operated by an electric motor or the like for rotating the cutter, and with a circumferential flange 21 about the mouth thereof against the outer face of which the cutter cartridge is adapted to be seated and held. A strap 22 engages and substantially surrounds the cylindrical surface of the cartridge housing and is securely connected thereto through the medium of outwardly pressed portions 23 of the housing engaging in openings 24 in the strap. The ends 25 and 26 of the strap are spaced apart by means of a spacing block 27 riveted thereto to form a yoke within which the upper portion 9 of the arm of the bracket is received and a pivot pin 28 passes through both sides of the yoke and through a longitudinal slot in the portion 9 for longitudinal and pivotal movement of the holder between the positions illustrated in full and dotted lines in Fig. 1. The block 27 is formed to provide an abutment lug adapted to abut against the lug 16 at one end of its movement and to be received within the slot or recess 14 at the other end of its movement with the cartridge holder for a purpose to be described. On either side of the yoke and against the exterior surfaces of the arms of the yoke, small hooks 29 are secured by means of rivets 31 which rivets also secure the blocks 27 in place to space the arms of the yoke apart. On each side of the expanded portions of the bracket adjacent the portion 9 thereof, a rivet or abutment pin 32 is secured with its head spaced from the surface of the bracket and between these pins and the hooks 29 springs 33 are connected. The springs 33 normally hold the lug formed on the spacer 27 within the recess 14, but through the medium of the pivot pin 28 working in the slot indicated in dotted lines at 10, Fig. 1, an outward pull on the cartridge holder against the tension of the springs 33 permits release of the lug from within the recess 14 whereupon the holder may be moved away from the arm 8 to the position illustrated in dotted lines in Fig. 1 where it is held by engagement of the lug of the spacer with the lug 16. The return movement is effected by pushing the holder toward the arm 8, the lug formed on the spacer riding along an arcuate face of edge 15 until the springs 33 engage the spacer lug within the recess 14.

The clamp

In the above noted copending application, the cartridge or housing was illustrated and described as adjustable, but in the present invention the cartridge holder or housing is non-adjustable with respect to the yoke band 22, and the clamp 34 is adjustable toward and from the arm 8 for the purpose of tightly securing different thicknesses of glass between it and the cartridge 35 held by the holder or housing 18. This clamp 34, the adjustment of which is effected by the screw 13 in the tapped hole formed by the outwardly pressed portions 12 of the arm 8 of the bracket, is secured to the adjustment screw, by the medium of a reduced end portion 36 passing through an opening 37 in the back of the clamp and secured for rotation therein through the medium of a washer 38 and a pin 39 or in any other suitable manner. The clamp 34 is formed in cup-shape of a cross section illustrated in Fig. 3 and the outer edges thereof are flanged outwardly as at 41.

A face plate or metal diaphragm 42 of sheet metal has its edges bent down or rolled around the outwardly flanged portions 41 of the clamp 34, in substantially water tight relation, but this diaphragm does not extend entirely across the mouth or front of the clamp for a central opening 43 and a circumferential series of small openings 44 are provided therein through which abradant and the fluid carrier for the abradant are received into the chamber or receptacle formed by the diaphragm 42 and body 34 of the clamp. For the purpose of insuring a water tight relation between the surface of the glass 3 against which the clamp is pressed and the face of the diaphragm 42, I prefer to secure a gasket 45 of resilient material, such as soft rubber, over a portion of the outer face of the diaphragm 42. This gasket is of cylindrical or ring shape and is provided with lip or flange portions 45' and 46 for engagement over the face of the diaphragm 42 and springing engagement over the rolled down edges thereof, respectively, and with openings in the portion 45' corresponding to the openings 43 and 44 in the diaphragm 42. The gasket when constructed in this manner may be removed and replaced without the use of cement or other adhesive which is apt to deteriorate.

For the purpose of draining abradant and liquid flowing into the receptacle or chamber in the body of the clamp at a lower portion of the body of the clamp 34 which is preferably made of pressed metal, an opening is formed by extruding or punching the metal outwardly as at 47. This opening is tapped to receive a spout 48 formed with a hook 49 at its upper outer end and upon this hook a small bucket 51 is hung to receive any material draining out of the chamber in the clamp. This little bucket 51 is a part of the glass cutting set and has been designed to receive the total contents from one cartridge together with any ground glass washed into the clamp receptacle after the hole has been cut through the glass.

The cartridge

The cartridge shown in Figs. 4 to 7 inclusive, is substantially similar to that described and claimed in the aforesaid copending application and comprises generally a thin metal shell portion of cup-shape designated 52 having an outwardly projecting circumferential flange 53 about which a thin metallic diaphragm 54 is secured in water tight relation. The diaphragm 54 is preferably composed of very thin soft penetrable material such as sheet brass and is equipped on its glass contacting face with a paper, fiber or other suitable material gasket 55 having cut away portions indicated at 56 for the purpose of reducing the amount of material to be cut away before the cutter reaches the surface of the glass.

The gasket is preferably composed of heavy oiled paper having a degree of compressibility in order to form a water tight connection between the cartridge and the glass and is secured to the diaphragm 54 with water proof cement or glue or in any other desirable manner. Before sealing the cartridge with the diaphragm 54, a nipple 57 formed of brass or any other suitable material, is tightly but revolubly inserted in a flanged opening 58 formed centrally in the back of the cartridge body 52 and provided with an elongated depressed portion 59 adapted to be engaged by a similarly shaped tool 61 (see Fig. 3) to be driven thereby.

A seal of wax or other material may be placed on the interior of the cartridge between the shell and the nipple to insure water tight relation of these parts, but this may be unnecessary if the nipple be made to tightly fit the opening in the sheet through which it projects. The cutter 62 is corrugated or ribbed as at 63 to provide an irregular cutting edge with a suitable number of openings 64 for a purpose to be hereinafter described and with an elongated opening 65 within which the elongated portion 59 of the nipple 57 is received. A tool 60 having a circumferential abutment 61 and a boss 61' adapted to seat and be positioned within the nipple serves to drive the cutter when said tool is connected to the driving shaft of an electric motor. When a suitable quantity of abradant and fluid carrier for the abradant has been placed within the cartridge, the cutter having been previously put in place on the nipple, the diaphragm 54 is sealed in place and the cartridge is ready for use.

In Fig. 8 I have shown a modified type of construction for the cartridge in which the parts are essentially the same as those described and shown in Figs. 4 to 7 inclusive with the exception that the shell 52 of the cartridge is formed with an outwardly and backwardly flanged portion 66 on which screw threads may be pressed for the reception of similar threads 67 formed on a ring cap 54' and whereby the destructible and removable diaphragm 55' of oiled paper or the like may be sealed or clamped to the shell and a resilient ring gasket 56' is cemented or otherwise secured to the outer face of the ring cap 54'. The central tool and nipple receiving portion is likewise threaded as at 68 to receive a similarly threaded cap 69 formed of lead or other easily punctured material to form a seal and if desired, the nipple 57 may be omitted. When it is desired to insert the tool 61 in the nipple or in the slot in the cutter if the nipple has been omitted, the tool is pushed through the sealing cap 69 for its purpose.

The operation

While it is believed that the foregoing description renders the operation of the apparatus entirely obvious, a brief description of the manner of connecting it to the glass of a windshield and drilling the hole therethrough will be given.

The windshield glass is preferably swung to the position shown in Fig. 1 and the bracket placed in position with the arms embracing opposite sides of the glass and the cartridge holder or housing is swung outwardly to the position illustrated in dotted lines. In this position a cartridge is inserted and the holder swung back to its first position where the spacer lug snaps into the depression 14. The clamp is then screwed down tightly against the glass with the spout 48 in its lowermost position. The bucket 51 is then hung on the hook 49 beneath the spout and the drilling operation is started by inserting the tool 61 within the nipple after it has been connected to the driving shaft of an electric motor or other prime mover.

Rotation of the tool will rotate the nipple 57 within the projecting portion 58 and thereby the cutter, which, after cutting through the diaphragm and connecting portions of the center and the rim of the gasket 55, operates on the glass, drives the abradant thereagainst and gradually cuts the hole therethrough. The openings 64 permit the abradant and liquid carrier therefor that may accumulate between the cutter and the rear of the shell to flow outwardly into the interior of the cutter and, in fact, under centrifugal action of the cutter, it appears that some suction action takes place between the front and back of the cutter due to these openings which pulls any liquid and abradant tending to accumulate behind the center of the cutter into the interior of the cutter. Whatever the principle of the operation, the result is, that leakage tending to occur between the nipple and the outwardly flanged portion 58 of the shell is minimized or entirely eliminated.

As soon as the cutter has penetrated the glass, the liquid carrier and abradant seep or flow through the cut in the glass into the chamber formed in the clamp and therefrom into the bucket 51 through the spout 48. This prevents the hard particles of abradant, ground glass and water from flowing onto the automobile or other vehicle or place utilizing the glass through which the hole is being cut. The cutter is stopped as soon as the hole has been cut through the glass to prevent its cutting through the rubber 46 and the bracket is removed from the glass and the used cartridge and cutter thrown away or returned to the factory as preferred.

The present device has been so designed and arranged that substantially all parts thereof, the bracket, cartridge housing or holder, the yoke therefor, the clamp, the metal clamp diaphragm and the parts of the cartridge may all be made from pressed or stamped sheet metal. This facilitates construction while producing a simple but strong structure which can be manufactured at low cost for its purposes. The apparatus is supplied to each spotlight dealer or other person who may desire to utilize the apparatus for cutting holes while the cartridges for use in connection with it, are supplied in quantities corresponding to the number of holes to be cut as will be understood. While I have illustrated and described a preferred form of the invention, it will be appreciated that the essence of the invention is capable of many embodiments and forms other than that shown. For this reason, I do not desire to be limited except by the spirit of the invention and the scope of the appended claims.

I claim:

1. In a cutting device, a clamping member having substantially parallel legs, clamp pivotally carried near the outer end of one of said legs, a second member pivotally and slidably connected to the other of said legs, said second member being movable relatively to said leg into and out of registering position with respect to said clamp and an article to be cut, and means for rigidly locking said second member in a position registering with said clamp.

2. In a cutting device the combination of a member comprising substantially parallelly disposed legs of unequal lengths, a clamp pad carried near the outer end of the longer leg, a yoke pivotally and slidably connected with the shorter leg, and forming an extension thereof, and means for rigidly locking said yoke to said shorter leg.

3. A device of the character described comprising, a bracket of U-shape, a clamp connected to one arm of the bracket and adjustable toward the second arm of the bracket, a cylindrical cartridge holder having an opening centrally at the back thereof secured to the second arm of said bracket, means whereby said cartridge holder may be swung about said second arm toward and from said clamp for the insertion of a cartridge, and means for resiliently opposing movements of said holder from positions to which it may be moved and set.

4. A glass cutter device comprising, a U-shaped bracket adapted to embrace sheet material, a cartridge holder, means for pivotally securing said holder on one arm of the bracket for engagement with one side of said material, the axis of the pivot being transverse the general plane of the bracket, releasable means for rigidly locking said first mentioned means in one position, and a clamp member adjustably mounted on the other arm of said bracket for cooperation with said holder to clamp said material therebetween.

5. A glass cutter comprising, a U-shaped bracket adapted to embrace sheet material, a cartridge holder, means for pivotally securing said holder on one arm of the bracket for engagement with one side of said material, releasable means for rigidly locking said first mentioned means in one position, and a cup-shaped clamp member forming a receptacle whereby abradant and fluid from a cartridge received in said holder may flow therein after said material has been perforated, connected to the other arm of said bracket for cooperation with said holder to clamp said material therebetween and to receive the abradant material from said cartridge.

6. A glass cutter comprising, a U-shaped bracket adapted to embrace sheet material, a cartridge holder, means for pivotally securing said holder on one arm of the bracket for engagement with one side of said material, releasable means for rigidly locking said first mentioned means in one position, a cup-shaped clamp member forming a receptacle, whereby abradant and fluid from a cartridge received in said holder may flow therein after said material has been perforated, secured in the other arm of said bracket and means for draining fluid and abradant from said clamp.

7. A glass cutter comprising, a U-shaped bracket adapted to embrace sheet material, a cartridge holder, means for pivotally securing said holder on one arm of the bracket for engagement with one side of said material, releasable means for rigidly locking said first mentioned means in one position, a cup-shaped clamp member forming a receptacle, whereby abradant and fluid from a cartridge received in said holder may flow therein after said material has been perforated, secured in the other arm of said bracket and a receptacle adapted to be releasably secured to the last said means for receiving abradant, fluid and debris flowing therefrom.

8. In a glass cutter of the character described, a clamp constructed to embrace a piece of sheet material, one member thereof being formed to support a glass cutter and abradant material, another member forming a receptacle of sufficient diameter and capacity to receive abradant fluid and debris after the material upon which the cutter is operating has been cut through, and a resilient gasket secured to the contacting face of said receptacle, said gasket having an aperture therethrough.

9. In a glass cutter of the character described, a clamp comprising, a cup-shaped portion forming a receptacle, and a resilient gasket secured to the rim of said cup-shaped portion and extending a portion of the distance across the mouth of said receptacle and having a plurality of openings therethrough within and adjacent the said cup portion.

10. A clamp for glass cutters comprising, a cup-shaped back portion, a substantially rigid diaphragm extending inwardly from the rim of said cup-shaped portion and with said back portion forming a receptacle, a resilient gasket secured on the exterior face of said diaphragm, and a plurality of openings through said gasket and said diaphragm for communication between the exterior and interior of said chamber.

11. A clamp for glass cutters comprising, a cup-shaped back portion, a substantially rigid diaphragm extending inwardly from the rim of said cup-shaped portion and forming with said back portion a receptacle, a resilient gasket secured on the exterior face of said diaphragm, a central opening through said gasket and diaphragm and a plurality of openings through said gasket and diaphragm adjacent the rim of said cup-shaped portion, providing communicating passage ways between the exterior and interior of the cup-shaped receptacle.

12. A clamp for glass cutters comprising, a cup-shaped back portion, a substantially rigid diaphragm extending inwardly from the rim of said cup-shaped portion and forming with said back portion a receptacle, a resilient gasket secured on the exterior face of said diaphragm, a central opening through said gasket and diaphragm, and a drain opening through the back of said cup-shaped portion.

13. A clamp for glass cutters comprising, a cup-shaped back portion, a substantially rigid diaphragm extending inwardly from the rim of said cup-shaped portion and forming with said back portion a receptacle, a resilient gasket secured on the exterior face of said diaphragm, a central opening through said gasket and diaphragm, a drain opening through the back of said cup-shaped portion, and means for receiving drainage from said receptacle adapted to be removably secured to said receptacle adjacent said drain opening.

14. In a glass cutter comprising, a U-shaped bracket formed of pressed metal, a cartridge holder formed of pressed metal and adjustably secured on one arm of said bracket, and an adjustable clamp of pressed metal, forming a receptacle for the reception of fluid from a cartridge held in said holder after the material upon which said cutter has operated has been perforated, attached to the other arm of said bracket.

15. A removable and replaceable cartridge for glass cutting and the like comprising, a shell containing a metallic cutter and abrading material, said cutter being rotatable in said shell and means for sealing said shell with said cutter and abrading material therein.

16. A removable and replaceable cartridge of the character described comprising, a sealed shell including a readily penetrable wall, said shell containing a cutting tool having a cutting edge facing said wall, said cutter being rotatable in said shell, and abrading material within said shell.

17. A cutting cartridge comprising a metal shell provided with a readily penetrable wall, a cutting tool and abrading material contained within the shell, said shell being constructed for the establishment of a driving connection between a rotatable driving spindle and said tool.

18. A cartridge comprising a cylindrical shell body open at one end, a readily penetrable wall secured to said body and sealing said open end thereof, a rotatable cutting tool disposed within the body and adapted to penetrate said wall upon rotation of the tool, and means whereby a driving connection may be established between a rotatable spindle and said tool through the rear wall of said body.

19. A cartridge comprising a cylindrical shell fully open at one end and provided with a centrally disposed aperture in its other end, a thin wall secured to and sealing the fully open end of said shell, a rotatable cutter and abrading material disposed within the shell, and means for sealing the opening in the rear wall.

20. A cartridge comprising a cup-shaped shell having an opening in its rear wall, a rotatable cutter disposed and sealed therein, and a nipple having a driving connection with said cutter projecting into the opening in the end wall of said shell.

21. In a cutting device the combination of a cylindrical shell, a rotatable cutter disposed therein, a readily penetrable wall sealing that end of the shell opposed to the cutting edge of said cutter, and a gasket secured to the margin of said wall outside of the perimeter of said cutter.

22. In a cutting device the combination of a cylindrical shell provided at its open end with a radially projecting flange, a rotatable cutter disposed within said shell, a wall closing the open end of said shell and attached to said flange, and a gasket secured to the outer face of said wall outside the perimeter of said cutter.

23. A cartridge comprising a cup-shaped shell having an opening in the bottom wall thereof, a rotatable cutter and an abradant disposed and sealed within said shell and a nipple projecting into operative engagement with the shell through the said bottom wall opening thereof and closing the opening through which it projects.

24. A glass cutter comprising, a cup-shaped shell, means for sealing the end of said shell, a cutter and a fluid within said shell, said cutter comprising a cup-shaped member nested in said shell, said cutter having a cylindrical side wall the free edge of which constitutes the cutting edge, and a bottom wall, said latter wall having a plurality of openings therethrough.

25. A cutter cartridge comprising a substantially cup-shaped shell having an opening substantially centrally of the bottom of the cup for the reception of a driving tool therethrough, a readily penetrable wall secured over the mouth of said shell and sealing the same, a rotatable cutting tool disposed within the shell and adapted to penetrate said wall upon rotation of the tool, means whereby a driving connection may be established between a driving tool and said cutting tool through the opening in the bottom of said shell, and a frangible seal closing the opening in the bottom of said cup-shaped shell.

26. A cutter cartridge comprising a substantially cup-shaped shell having an opening substantially centrally of the bottom of the cup for the reception of a driving tool therethrough, a readily penetrable wall secured over the mouth of said shell and sealing the same, a rotatable cutting tool disposed within the shell and adapted to penetrate said wall upon rotation of the tool, means whereby a driving connection may be established between a driving tool and said cutting tool through the opening in the bottom of said shell, and a frangible metal seal closing the opening in the bottom of said cup-shaped shell.

27. A glass cutter cartridge comprising, a cylindrical shell, a cutter and abradant substance therein, said shell having a threaded rim portion, and means for engaging said threaded rim portion for closing said shell, said cutter being rotatably mounted in said shell.

28. A glass cutter cartridge comprising, a shell forming a receptacle having a rimmed opening for reception and discharge of an abradant substance therein, a cutter in said shell a destructible diaphragm adapted to cover said opening, means removably engaged with said rim for securing said diaphragm over said opening, and means for operating said cutter while the cutter is within said shell.

29. A glass cutter comprising, a shell of cup-shape, a cutter and an abrasive mixture therein, said cutter being rotatably mounted in said shell, a destructible diaphragm for closing the mouth of said cup-shape shell, and means removably engaged with said shell for securing said diaphragm over said mouth.

30. A glass cutter cartridge comprising, a metal shell of cup-shape, a cutter and an abrasive mixture therein, and a destructible and replaceable diaphragm covering the mouth of said shell, said cutter being rotatable while in said shell.

GEDOR W. ALDEEN.